W. ZACHOW.
BALING PRESS.
APPLICATION FILED JULY 27, 1911. RENEWED OCT. 27, 1917.
1,258,848.
Patented Mar. 12, 1918.
12 SHEETS—SHEET 1.
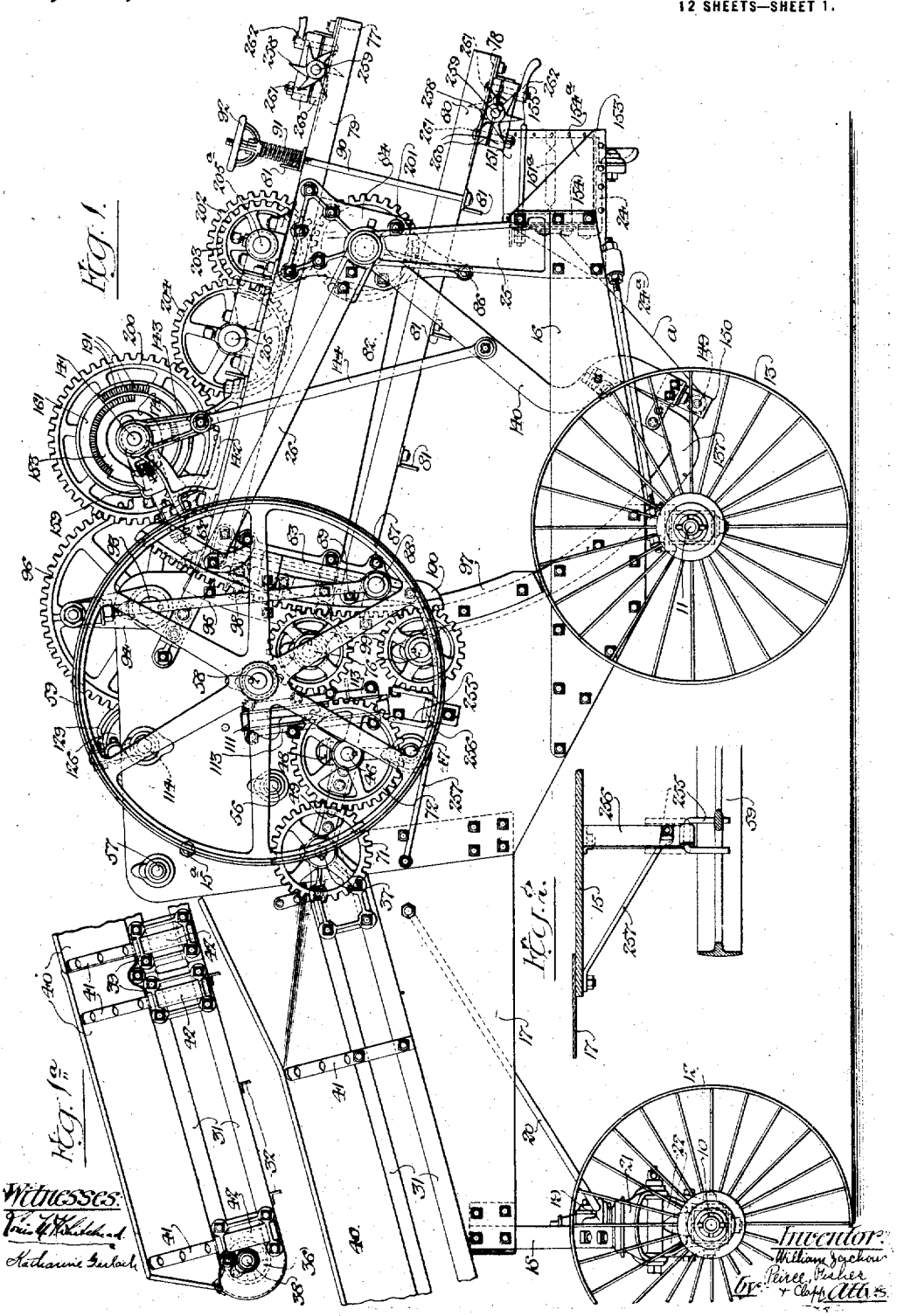

W. ZACHOW.
BALING PRESS.
APPLICATION FILED JULY 27, 1911. RENEWED OCT. 27, 1917.
1,258,848.
Patented Mar. 12, 1918.
12 SHEETS—SHEET 2.
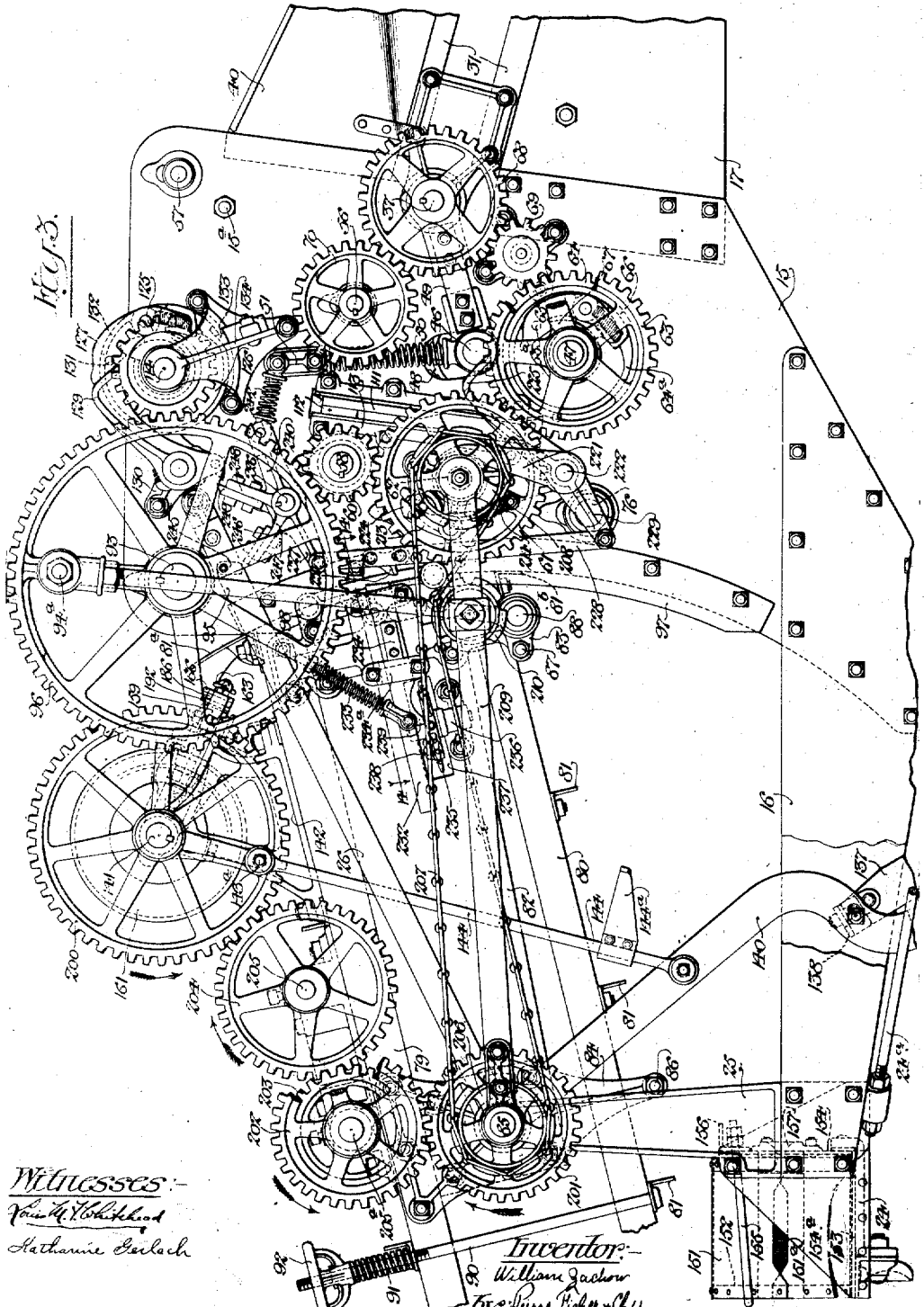

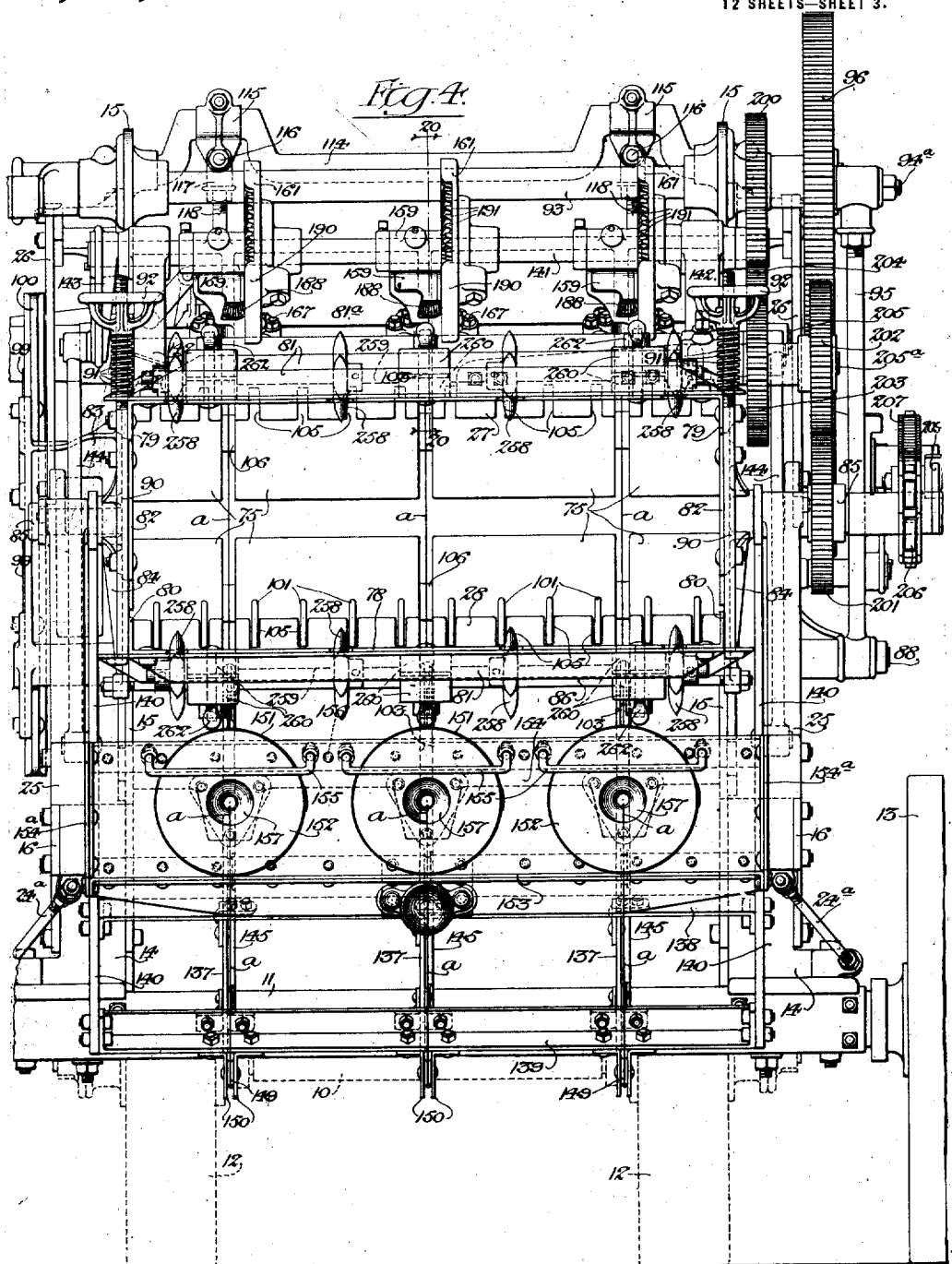

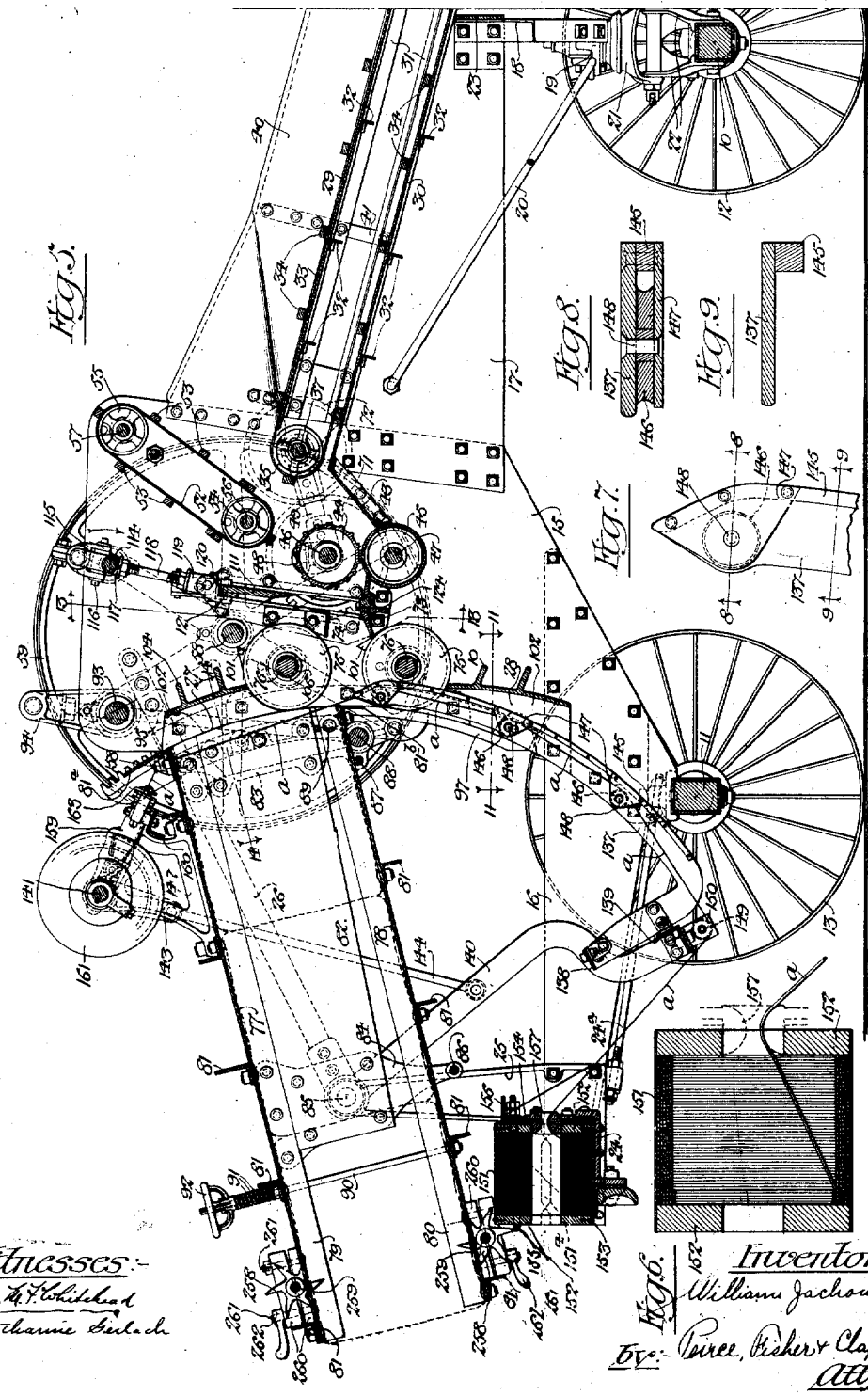

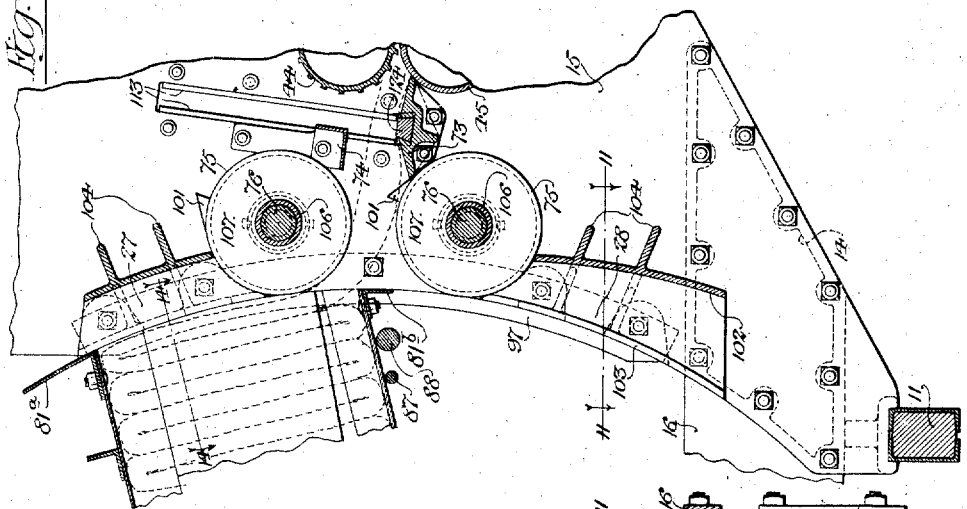
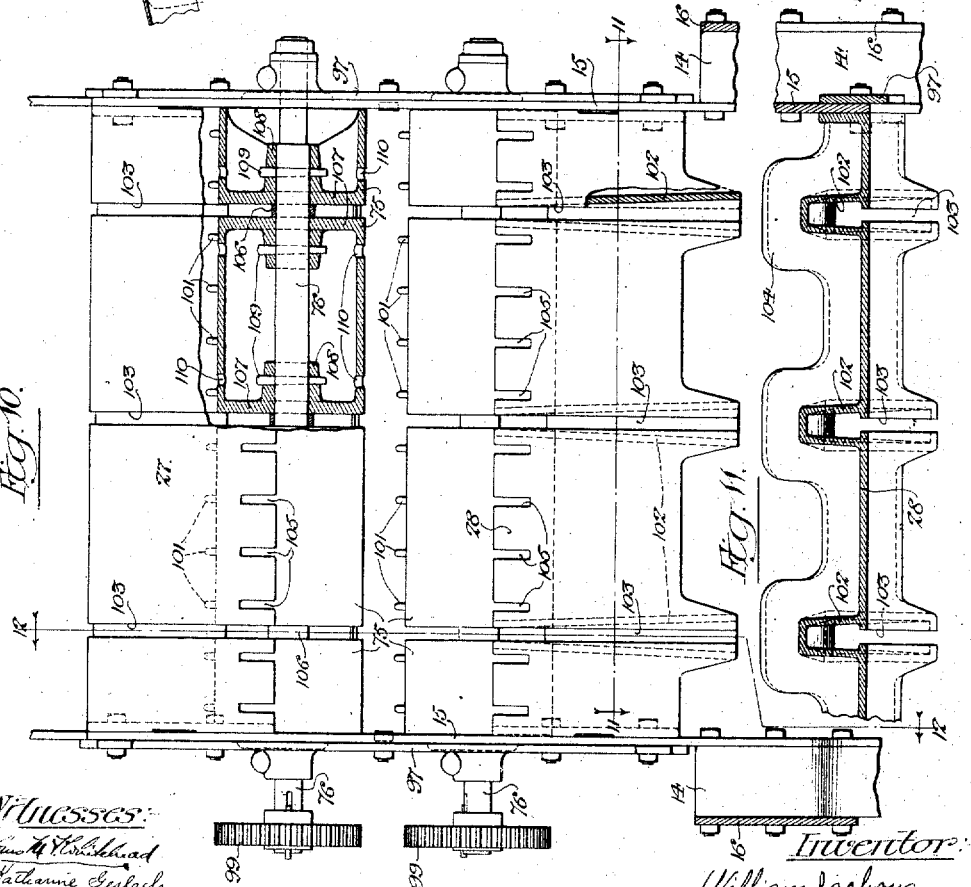

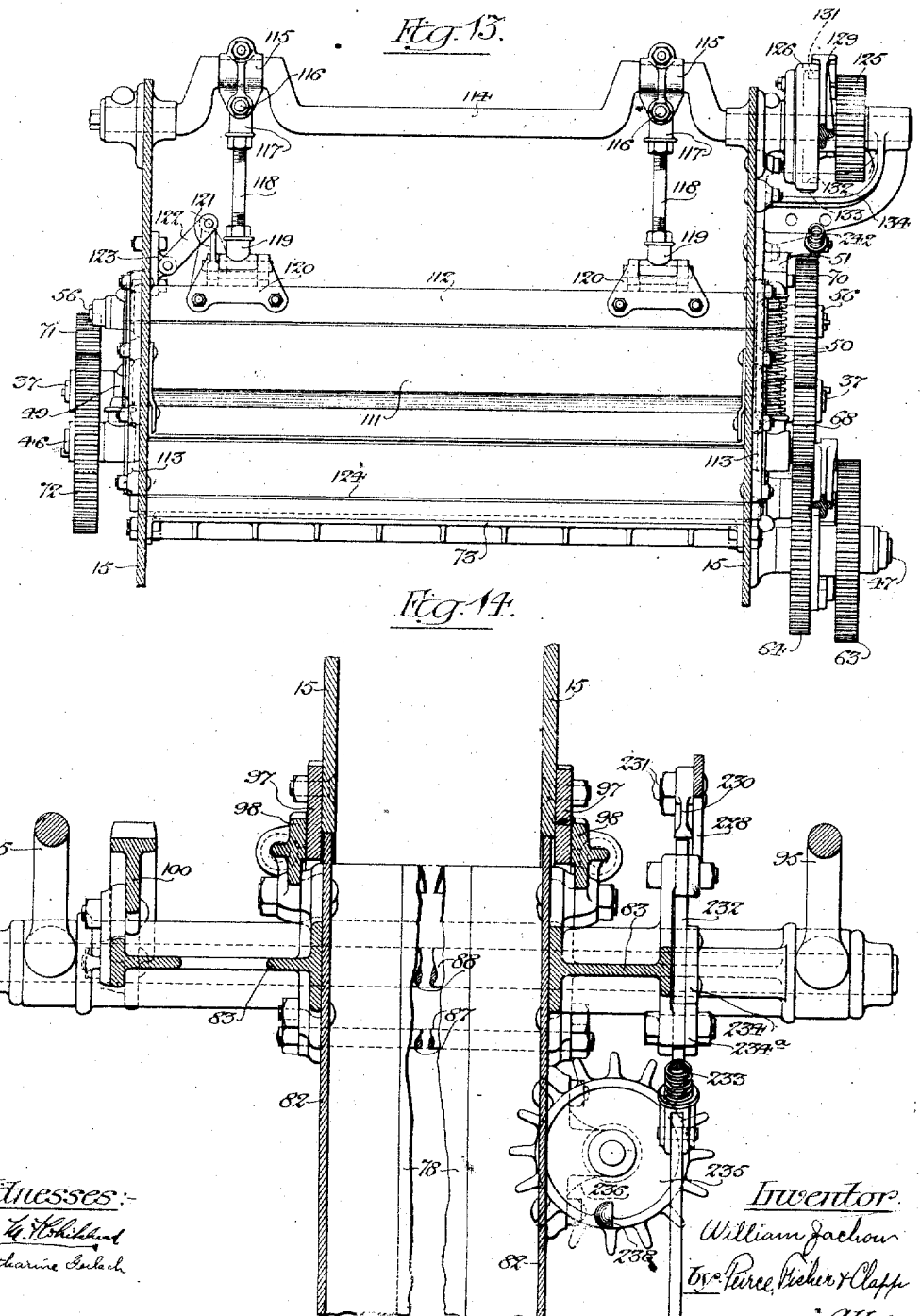

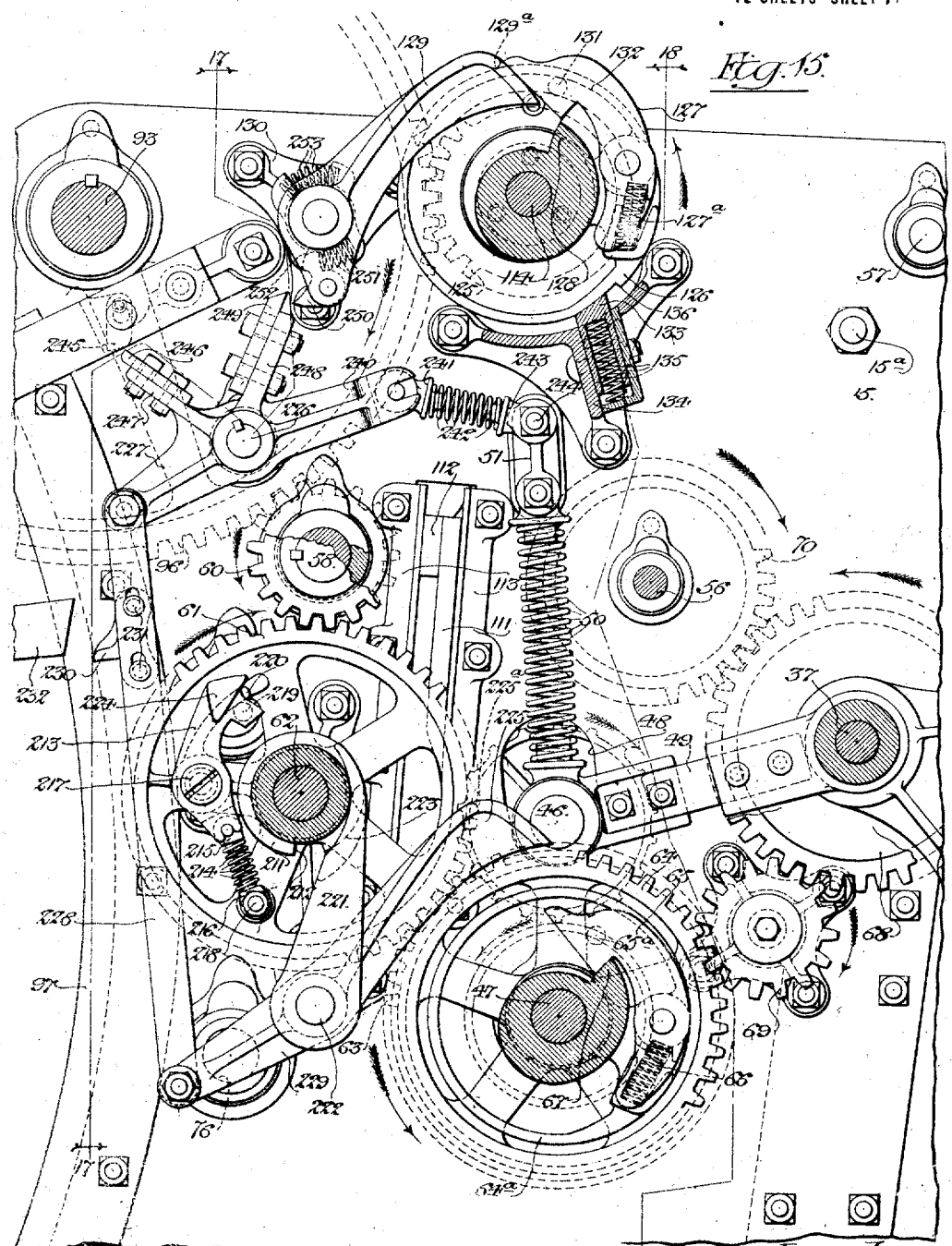

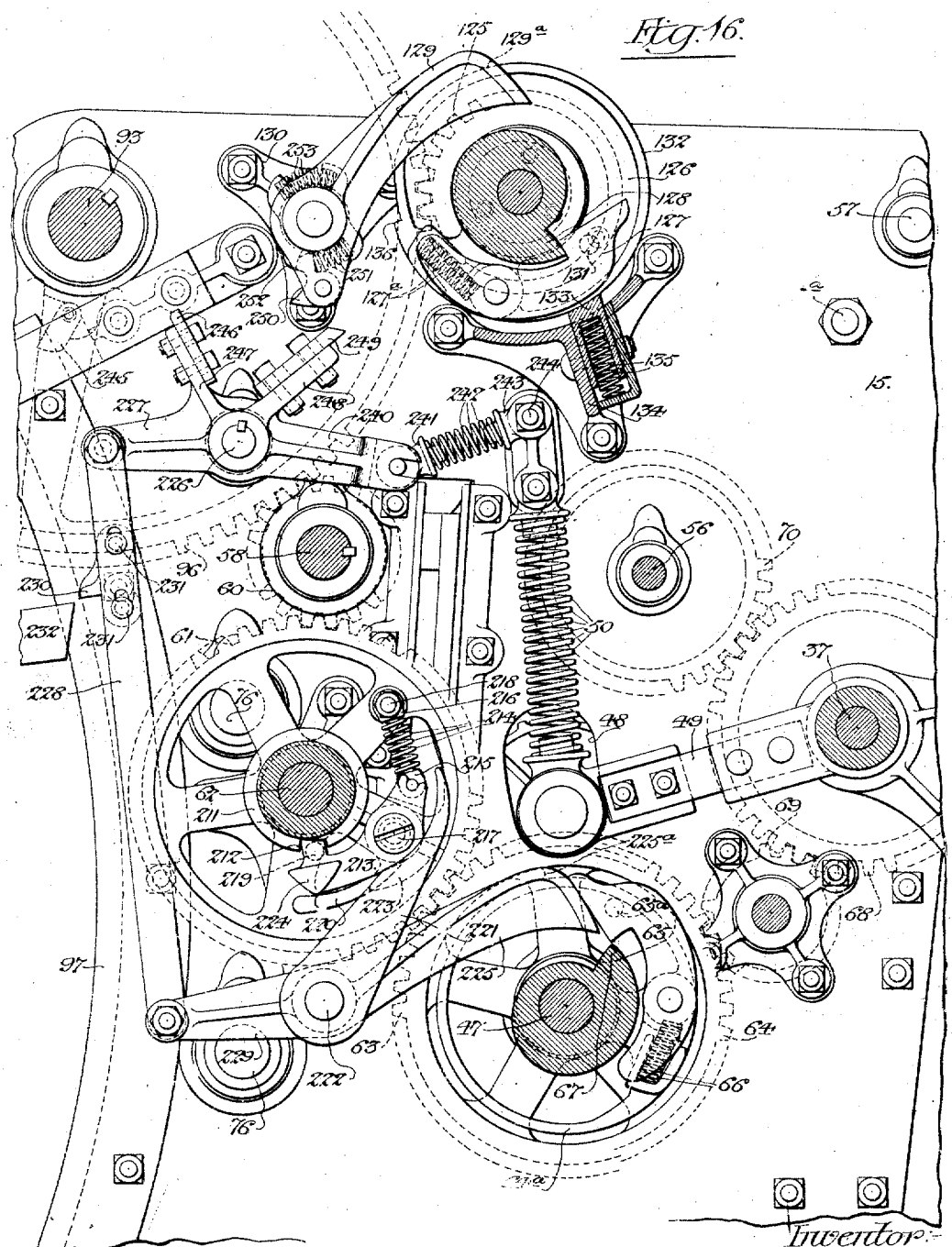

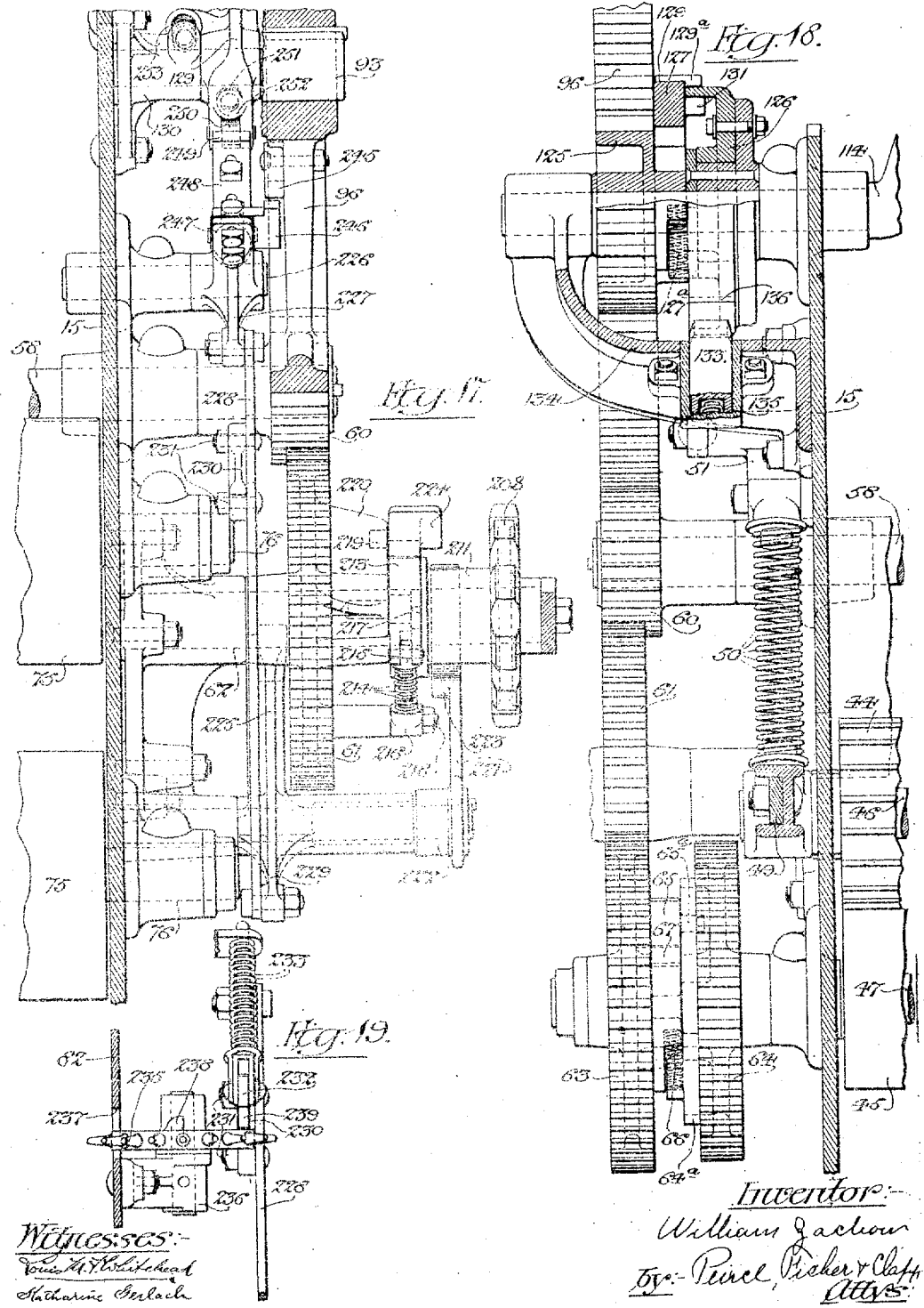

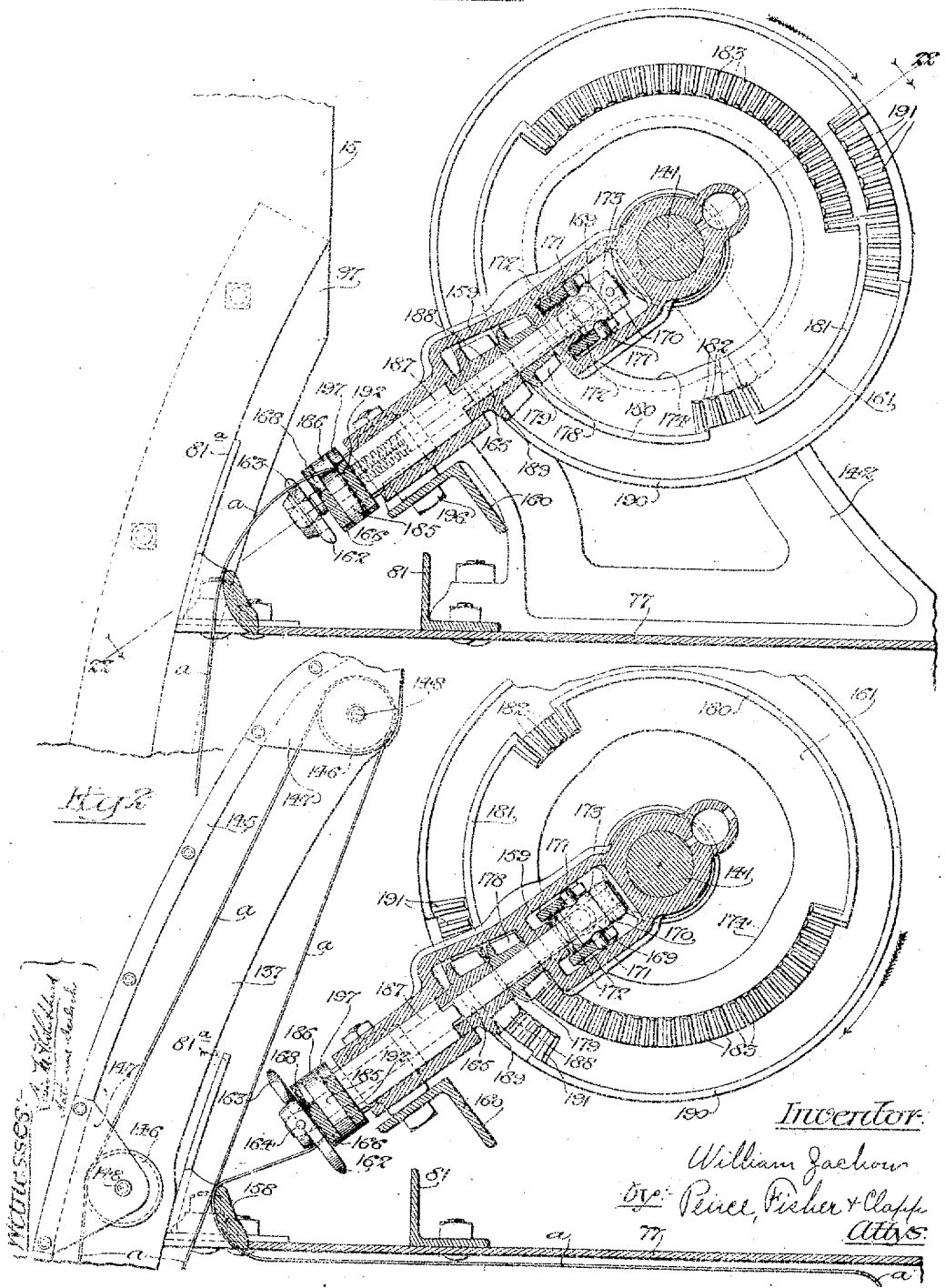

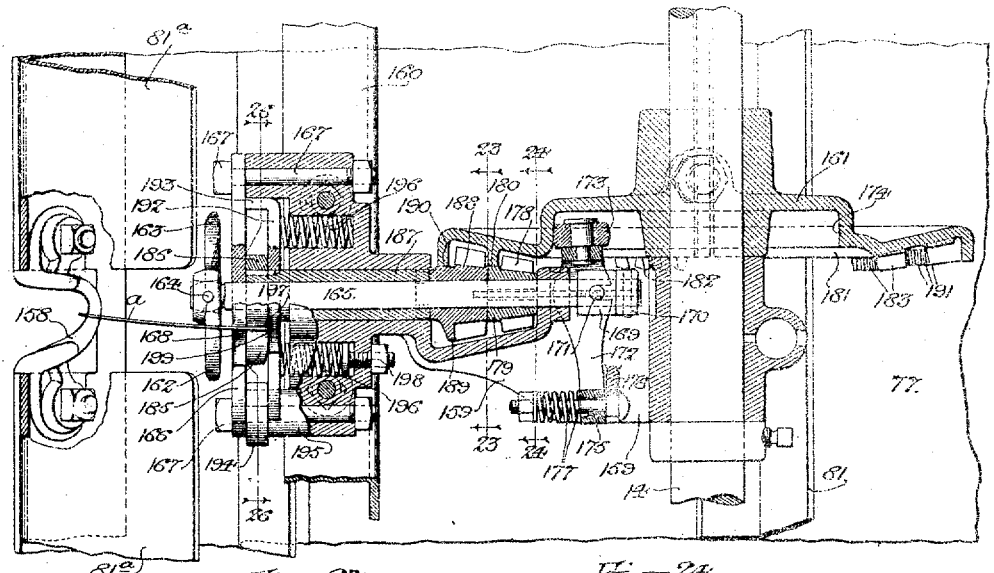
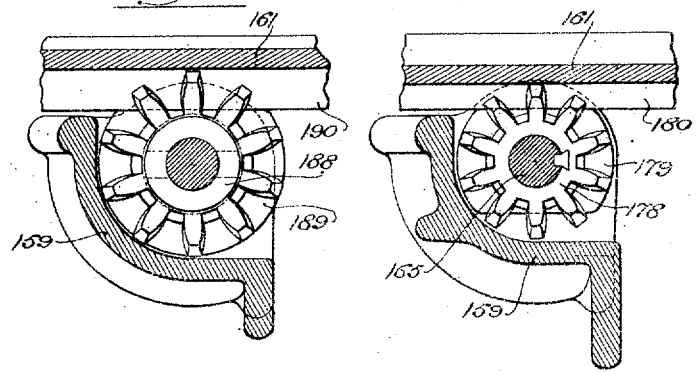
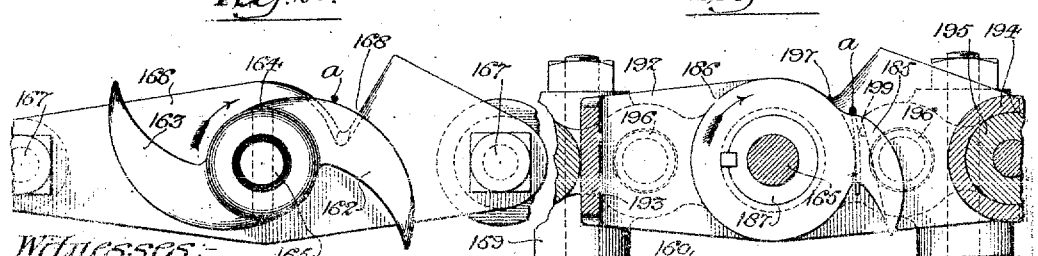

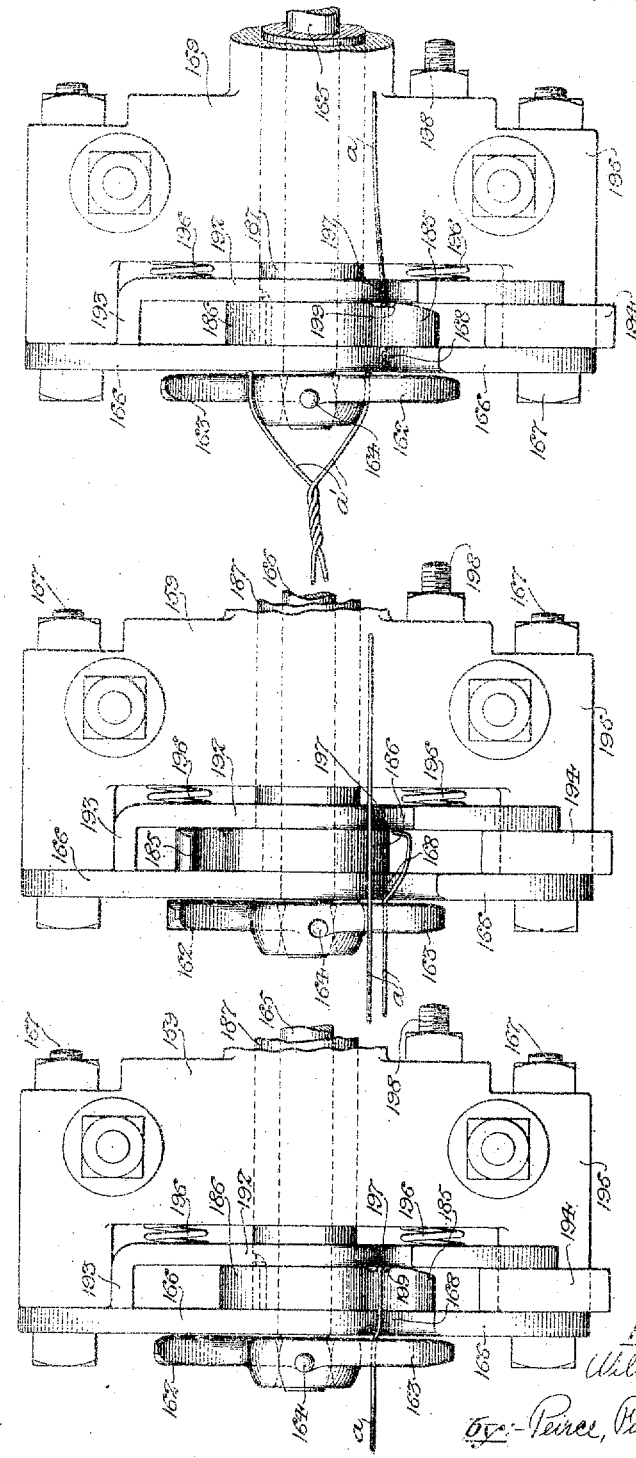

UNITED STATES PATENT OFFICE.

WILLIAM ZACHOW, OF RACINE, WISCONSIN, ASSIGNOR TO J. I. CASE THRESHING MACHINE COMPANY, OF RACINE, WISCONSIN, A CORPORATION.

BALING-PRESS.

1,258,848.  Specification of Letters Patent.  Patented Mar. 12, 1918.

Application filed July 27, 1911, Serial No. 640,859. Renewed October 27, 1917. Serial No. 198,881.

*To all whom it may concern:*

Be it known that I, WILLIAM ZACHOW, a citizen of the United States, and a resident of Racine, county of Racine, and State of Wisconsin, have invented certain new and useful Improvements in Baling-Presses, of which the following is a full, clear, and exact description.

The invention relates to baling presses and seeks to provide improved mechanism by which pressed bales of straw, hay or the like may be rapidly formed. The invention consists in the features of improvement hereinafter set forth, illustrated in the preferred form in the accompanying drawings and more particularly set forth in the appended claims.

In the drawings, Figure 1 is a view in elevation of the left-hand side of the improved baling machine. Fig. 1ª is a view in elevation of the forward end of the conveyer that delivers the straw, hay or the like to the machine. Fig. 2 is a detail plan section of parts shown in Fig. 1. Fig. 3 is a view in elevation of a portion of the right-hand side of the machine. Fig. 4 is a rear view. Fig. 5 is a longitudinal section. Fig. 6 is an enlarged section of the wire holding can. Figs. 7, 8 and 9 are detail views of the needle for passing the wire around the bales, Figs. 8 and 9 being sections on the lines 8—8 and 9—9 respectively, of Fig. 7. Fig. 10 is a view in rear elevation of the segmental plate and pressure rolls at the front end of the baling box with parts broken away and shown in section. Fig. 11 is a plan section on the lines 11—11 of Figs. 5, 10 and 12. Fig. 12 is a section on the line 12—12 of Fig. 10. Fig. 13 is a view in elevation of the knife mechanism with the side plates shown in section on the line 13—13 of Fig. 5. Fig. 14 is a plan section on the line 14—14 of Figs. 3 and 12, illustrating the construction of the forward end of the baling box. Fig. 15 is an enlarged detail view of a portion of the operating mechanism at the right-hand side of the machine with parts broken away and shown in section. Fig. 16 is a similar view with the parts shown in shifted position. Fig. 17 is a rear elevation of the gearing shown in Figs. 15 and 16 with the side plate shown in section on the line 17—17 of Fig. 15. Fig. 18 is a front elevation of the gearing shown in Figs. 15 and 16 with the side frame and other parts shown in section on the line 18—18 of Fig. 15. Fig. 19 is a detail view of the controller wheel. Fig. 20 is a view in vertical elevation on the line 20—20 of Fig. 4 of the knotter mechanism. Fig. 21 is a similar view showing the parts in changed position. Fig. 22 is a section on the line 22—22 of Fig. 20. Figs. 23 and 24 are detail sections on the lines 23—23 and 24—24 of Fig. 22. Fig. 25 is an end view of the knotting twister. Fig. 26 is a detail view on the line 26—26 of Fig. 22. Figs. 27, 28 and 29 are plan views of the knotting twister and knife for severing the wire, illustrating different positions of the parts.

The main frame is mounted upon the axles 10 and 11 of the front and rear wheels 12 and 13. Heavy cast metal brackets 14 (see Fig. 4) are mounted upon the ends of the rear axle 11 and upwardly extending vertical side plates 15 and rearwardly extending horizontal side plates 16 are bolted respectively to the inner and outer faces of the brackets 14. Side plates 17 are bolted to the forward edge of the vertical side plates 15 and extend forwardly therefrom. The front ends of these side plates are carried upon a transverse brace bar 18 which is connected to a head or part 19. This part is also connected by upwardly and rearwardly inclined brace bars 20 to the upper rear portions of the side plates 17. A bolster head 21 is vertically swiveled on the part 19 and brackets 22, rising from the central portion of the front axle 11, are horizontally swiveled upon the head 21. The front ends of the side plate 17 are connected by a transverse brace bar 23 (see Fig. 5) and the rear ends of the side plates 16 are connected by a transverse, cast metal bar 24. A pair of cast metal upright brackets 25 are secured to the rear ends of the side plate 16 and the upper ends of these brackets are connected to the upper ends of the side plates 15 by brace bars 26. The rear edges of the side plates 15 are segmental and are connected by two heavy, segmental plates 27 and 28 (see Figs. 4, 10, 11 and 12) of cast metal.

The straw, hay, or the like to be baled is delivered to the machine by a conveyer at the forward end thereof. This conveyer is upwardly and rearwardly inclined at the front end of the machine, as shown, and comprises upper and lower sheet metal plates 29 and 30 extending between side bars 31 and provided with strengthening angle bars 32. Endless belts 33 connected by cross strips 34 pass over pulleys 35 and 36 (see Figs. 1ª and 5) mounted on shafts 37 and 38 at the opposite ends of the conveyer. The conveyer is preferably divided into sections, the rear section being mounted upon the front side plates 17 of the machine and the front section having a hinged connection 39 with the rear section. Both sections of the conveyer are provided with flaring side plates 40 extending above the floor 29 over which the hay or straw is carried and held in position by bars 41. The bars 41 of the outer section are removably seated within sockets 42, so that the side plates 40 of the outer section can be removed and the latter swung upwardly and rearwardly onto the rear section of the conveyer to thereby decrease the length of the machine when it is not in use.

As the straw, hay, or the like is delivered from the upper rear end of the conveyer it passes over a downwardly, rearwardly inclined guide plate 43 and between a pair of upper and lower feed rollers 44 and 45 that are mounted respectively upon the transverse shafts 46 and 47. The transverse guide plate 43 extends between and is fixed to the vertical side plates 15 of the machine and the shaft 47 is journaled in these side plates. The shaft 46 extends through slots 48 in the side plates 15 (see Figs. 1 and 3) and is journaled in the rear ends of a pair of arms 49, the rear ends of the arms being hung upon the shaft 37. The upper feed roller is thus free to rise and fall, but it is forced downwardly to press the layer of straw between it and the lower feed roller by a spring 50 (see Figs. 3 and 5) which extends between the rear end of the adjacent arm 49 and a bracket 51 on the adjacent side plate 15.

To assist in properly delivering the straw to the feed rollers, a short supplemental conveyer is arranged above and behind the rear end of the main conveyer. This supplemental conveyer is downwardly and rearwardly inclined toward the feed rollers 44 and 45 and comprises an endless belt 52 having cross strips 53 thereon passing over a pair of pulleys 54 and 55 which are carried upon a pair of transverse shafts 56 and 57, the shafts being journaled in suitable bearings in the side plates 15. The feed rollers and the upper and lower conveyers are driven from a main drive shaft 58 which extends transversely between and is journaled in suitable bearings on the vertical side plates 15 and which is provided at one end with a pulley 59 adapted to receive a belt from an engine or other suitable source of power. At the opposite end, the main drive shaft is provided with a pinion 60 (see Figs. 3, 15 and 18) which meshes with a gear 61. This gear is loosely mounted upon a stud shaft 62 which is fixed to and projects outwardly from the adjacent side plate 15. The gear 61 meshes with a gear 63 that is loosely mounted upon the right-hand end of the shaft 47 of the lower feed roller 45. A second gear 64 fixed to the shaft 47 is normally connected to the gear 63 by a releasable clutch. This clutch comprises a dog 65 (see Figs. 15 and 16) which is pivoted upon the gear 64 and which is normally held by a spring 66 in engagement with a cam lug, or shoulder 67 on the hub of the gear 63.

The drive shaft 37 of the main conveyer is provided at its right-hand end with a gear 68 and is driven from the shaft 47 of the lower feed roller through the medium of an idler pinion 69 which is journaled upon a suitable bracket on the adjacent side plate 15 and meshes with the gears 64 and 68. The gear 68 also meshes with a gear 70 fixed to the drive shaft 47 of the upper supplemental conveyer (see Figs. 3 and 15). At the left-hand side of the machine the shaft 37 is provided with a gear 71 which meshes with the gear 72 on the shaft 46 of the upper feed roller 74. By the gearing described, the main and supplemental conveyers and the feed rollers are rotated during the operation of the machine. At intervals the feed of straw, hay or the like to the machine is arrested, as hereinafter described, by disengaging the clutch dog 65 to thereby disconnect the operating mechanism of the conveyers and feed rollers from the main drive shaft. Preferably, as shown in Fig. 5, the upper feed roller is provided with ribs or corrugations.

From the feed rollers 44 and 45 the layer of straw passes over a transverse guide bar or plate 73 and beneath a transverse angle bar 74 and thence between a pair of guide rollers 75 into the baling box at the rear portion of the machine. The transverse bars 73 and 74 extend between and are fixed to the side plates 15 and the guide rollers 75 are mounted on transverse shafts 76 that are suitably journaled in these side plates. These rollers are located, as shown, between the segmental plates 27 and 28.

The baling box comprises transverse upper and lower plates 77 and 78 which are connected at their edges to angle bars 79 and 80 and are provided on their outer faces with strengthening angle bars 81. Side plates 82 depend from the bars 79 and cast metal brackets 83 and 84 are securely bolted to the front and rear ends of the bars 79 and of the side plates 82. The brackets 84 are provided with lateral projecting trunnions 85 which are journaled in the upper ends of the brackets 25 and which are connected to the rear ends of the brace bars 26. The lower ends of the brackets 84 are connected beneath the bottom plate 78 by a transverse rod 86. The lower ends of the brackets 83 are connected beneath the bottom plate 78 by a transverse rod 87 and a transverse shaft 88. The lower plate 78 of the box is pivotally connected to the lower ends of the brackets 83 by bolts 89 that extend through the brackets and through the forward ends of the side bars 80 of the lower plate. The rear end of the lower plate is connected to the upper plate by a pair of rods 90 extending through two of the angle bars 81. Springs 91 are coiled about the upper ends of these rods and extend between the upper angle bars and a pair of hand wheels which are threaded upon the upper ends of the rods 90. By this arrangement, the upper and lower plates of the baling box are yieldingly spring pressed upon the bales at the rear end thereof to resist the movement of the bales therethrough and so that the straw or hay must be forced under considerable pressure into the front end of the baling box. The amount of pressure can be regulated as desired by means of the hand wheels 92.

The baling box as a whole is oscillated upon the trunnions 85 during the operation of the machine. For this purpose, a transverse shaft 93 journaled in the upper rear portions of the side plates 15 is provided at its ends with a crank arm 94 and a crank pin 94ª on a gear 96 that are connected by pitman rods 95 to the ends of the shaft 88 at the lower front end of the baling box. The shaft 93 is provided at the right-hand side of the machine with a gear 96 which meshes with the pinion 60 on the main drive shaft 58 (see Fig. 3). By this mechanism the baling box is constantly oscillated up and down during the operation of the machine. The rear edges of the vertical side plates 15 of the frame and the rear faces of the transverse plate castings 27 and 28 attached thereto, are coincident and concentric with the pivotal axis of the baling box. The upper and lower side bars 79 and 80 of the latter are connected by transverse angle bars 81ª and 81ᵇ and the upwardly and downwardly projecting flanges of these bars move closely adjacent the segmental surface of the transverse plates 27 and 28. The edges of the side plates 82 of the box (see Figs. 12 and 14) move closely adjacent the segmental edges of the side plates 15 and a pair of segmental guide bars 97 secured to the outer faces of the side plates overlap the forward side edges of the baling box, as most clearly shown in Fig. 14. The cast metal brackets 83 at the forward end of the box have forwardly projecting lugs 98 fixed thereto which overlap the outer faces of the segmental guide bars 97. By this arrangement, the forward end of the box is properly guided and held against lateral movement.

The rollers 75 are arranged between the segmental plates 27 and 28 and the plane or path of movement of the forward end of the box and the segmental faces of the plates are tangent to the peripheries of these rollers at the rear sides thereof, so that the rollers will engage and compress the material in the forward end of the box as the latter is oscillated. The shafts 76 whereon the rollers 75 are mounted are provided on their outer left-hand ends with gears 99 (see Figs. 1 and 10) and these gears are engaged by a segment rack 100 mounted on the forward end of the baling box at its left-hand side. The bracket 83 on this side of the box is provided with a projecting portion (see Fig. 14) to which the segment rack 100 is connected. The straw, hay or the like is fed in a web by the rollers 44 and 45 over the guide plate 73 and between the rollers 75. The web of material passes between these rollers and into the forward end of the baling box and is folded back and forth therein as the box is reciprocated, as indicated in dotted lines in Fig. 12. The oppositely rotating rollers 75 guide the web of material into the box and assist in folding it back and forth therein. That is to say, as the box moves up the web of material passes around the upper roller 75 and when it moves down, it is guided around the lower roller. The rollers and the segmental plates 27 and 28 also act to compress the material within the forward end of the box as the latter is reciprocated. Preferably, also, the rollers 75 are provided each with a row of beveled teeth 101. These teeth are provided with beveled faces and radial faces and are oppositely arranged, as shown. When the box is moving up, the teeth of the upper roller engage the web and tend to force the material upwardly toward the upper portion of the box. When the box is moving down, the beveled faces of the teeth on the upper roller are moved over the web of material, so that the movement of the latter is not affected thereby, but the abrupt or radial faces of the teeth on the lower roller then engage the web of straw, hay or the like and force it down toward the lower portion of the box.

The baling box is open ended and is of sufficient length to receive two or more bales, as indicated in dotted lines in Fig. 5, and the upper and lower sections of the box are forced together at their rear ends by the springs 91 to resist the movement of the bales through the box. By this arrangement, the previously formed bale acts as an abutment against which the next bale is formed. The feed rollers 44 and 45 and the guiding and compression rollers 75 act to force the web of material into the open end of the box and against the previously formed bale, the web of material being folded back and forth in the box, as the latter is oscillated. The feeding of the material into the box also serves to force the finished bales through the box and automatically discharge them from its open rear end.

The segmental guide plates 27 and 28 are provided with guide-ways 102 (see Figs. 10, 11 and 12) for the wire carrying needles. These guide-ways are preferably cast in piece with the plates 27 and 28 and are formed upon the rear faces thereof behind guiding slots 103 in the plates. The plates are also provided on their rear portions with strengthening flanges 104. The lower edge of the plate 27 and the upper edge of the plate 28 extend closely adjacent the periphery of the rollers 75 and the edges of the plates are provided with slots 105 (see Fig. 10) to permit the passage of the beveled teeth 101 of the rollers therethrough. To permit the passage of the wire carrying needles in front of the inlet end of the baling box, the rollers 74 are formed in separate sections which are keyed to the shaft 76 and are separated by collars 106 on the shaft to form spaces between the sections in line with the needle guide-ways and slots 102 and 103 in the segmental plates. The sections of the rollers 75 are preferably hollow and are provided with ends or heads 107 having inwardly projecting hubs 108 through which keys 109 extend to secure the rollers to the shaft 76. The periphery of each section of the rollers is provided with openings 110 in line with the keys 109, so that the parts can be readily assembled or disconnected for repairs.

When sufficient material is fed into the box to form a bale, the operation of the feeding conveyer and of the feed rolls 44 and 45 is arrested and the web is cut off by a knife 111 which reciprocates vertically between the feed rollers 44 and 45 and the guiding rollers 75. The knife 111 is fixed at its upper edge to a bar 112 and the ends of these parts extend through slots in the side plates 15 of the frame, suitable guides 113 being secured to the outer faces of the plates 15 at the edges of the slots. The knife is suspended from a transverse crank shaft 114 journaled in the side plates 15. Collars 115 (see Fig. 13) on the crank arms of this shaft are connected by horizontal pivot bolts 116 to couplings 117 on the upper ends of a pair of link rods 118. The couplings 119 on the lower ends of the rods are horizontally pivoted to brackets 120 on the knife bar 112. The left-hand bracket 120 is provided with an upwardly projecting lug 121 which is connected by a link 122 to a bracket 123 fixed to the inner face of the adjacent side plate 15. When the shaft 114 is rotated, the knife 111 is depressed to sever the web passing from the feed rollers 44 and 45. In this lowermost position, the knife engages a transverse wooden strip 124 set into the guide plate 73 (see Fig. 12). During the downward movement of the knife toward the wooden strip, the link 122 serves to shift the knife lengthwise, so that it operates with a draw cut, and thereby serves to effectually sever the web of material.

The knife operating shaft 114 is provided at its right-hand end with a pinion 125 which meshes with the gear 96 on the shaft 93 and is constantly rotated at high speed thereby. This pinion 125 is loose on the shaft and the latter is provided with a clutch disk 126 (see Figs. 15 and 18) fixed thereto. A clutch dog 127 pivoted on the disk is arranged to engage a lug or shoulder 128 formed upon the hub of the pinion 125. Normally the knife shaft 114 is held stationary with the clutch dog in disengaged position by a trip arm 129 that is pivoted upon a bracket 130 on the adjacent side plate 15. This trip normally holds the clutch dog 127 in disengaged position with a laterally projecting pin 131 thereon held against the inner periphery of a laterally projecting flange 132 on the disk 126. The backward movement of the knife shaft 114, when the clutch dog is in disengaged position, is prevented by a stop pawl 133 which is mounted in a socket of a bracket 134 on the adjacent side plate and which is pressed by a spring 135 against the periphery of the disk 127 and is adapted to coöperate with a shoulder 136 thereon to prevent the backward movement of the knife operating shaft 114. The knife shaft is arrested by the clutch tripping arm 129 with the knife uplifted and the crank arms of the shaft 114 in front of the center of the shaft. When the trip arm 129 is shifted to release the dog, the latter is forced by a spring 127ᵃ into engagement with the shoulder 128, so that the shaft 114 is rotated in the direction indicated by the arrows in Figs. 5 and 15. Moreover, inasmuch as the crank arms are normally slightly in front of the axis of the shaft 114, the downward movement of the knife is assisted by gravity and the knife acts to effectually sever the web of straw by its engagement with the wooden strip 124. As soon as the parts are restored to normal position, the movement of the upper end of the knife and trip arm 129 disengages the clutch dog 127 and arrests the movement of the parts. At this point the shoulder 136 on the disk 127 has moved past the stop pawl 133 which prevents the backward movement of the knife operating shaft.

Means are provided for tying a number of wires about the bales as formed. In the construction illustrated three wires are tied about each bale and for this purpose three wire carrying needles 137 are provided. These needles are formed of segmental flat bars and arranged to slide through the guide-ways and slots 102 and 103 of the segmental plates 27 and 28. The lower ends of the needles are provided with offset portions that are secured to a pair of cross-bars 138 and 139 and these cross-bars extend between the lower ends of a pair of arms 140, the upper ends of which are hung upon the trunnions 85 of the baling box. A needle operating shaft 141 is journaled in brackets 142 on the upper front end of the baling box. The ends of this shaft are provided with a crank arm 143 and a pin 143$^a$ on a gear 200 which are connected by links or rods 144 to the side arms 140. When the shaft 141 is rotated through a single revolution, the needles 137 are raised and lowered to carry the wires in front of the box.

Guide strips 145 are secured to the sides of the needle bars adjacent their outer edges and a number of rollers 146 are mounted upon the sides of the bars. Each of these rollers is preferably arranged between the bar 137 and a plate lug 147 secured to the guide strip 145, the roller being journaled upon a stud 148 extending through the bar and the plate lug 147. A series of guide rollers 149 are also mounted between supporting lugs 150 that depend from the cross-bar 139.

The tie wire is carried on the machine in a series of cans. These cans comprising cylindrical sheet metal body portions 151 having end heads 152 and the heads are provided with central openings therein. The cans are mounted upon a shelf 153 that is carried upon the transverse bar 24 with the inner ends of the cans against a vertical plate 154 also fixed to the transverse bar 24 and connected to the shelf 153 by triangular end plate 154$^a$. U-bolts 155 extend over the upper portions of the cans and through an angle bar 156 at the upper edge of the plate 154. By loosening the nuts on the U-bolts, the empty cans can be removed and full cans placed in position upon the machine. A series of guide pieces 157 are fixed to the plate 154 and the inner portion of the guide piece is adapted to extend within the central opening of the inner head 152 of the can. This guide is provided with a flaring rounded opening through which the wire from the can passes.

The wire $a$ is coiled snugly within the can in a series of cylindrical layers and the layers are successfully withdrawn from the can beginning with the innermost layer of wire. By this arrangement, it is unnecessary to provide reels and the wire is withdrawn on the machines and there is no kinking or twisting of the wire as it is withdrawn. When the needles 37 are lifted the wire is withdrawn very rapidly from the cans, but when the needles reach the upper ends of their movement, the tension on the wire coil within the cans arrest the movement of the wires so that the wires remain taut. With rotating reels, it is difficult to overcome the momentum imparted thereto as the wire is withdrawn. The cans have longitudinal openings 151$^a$ in their sides so that they may be readily inspected to determine whether or not the wire therein is exhausted.

The wires $a$ pass from the cans down beneath the guide rollers 149 and thence upwardly through the needles and between the guide rollers 146 and guiding strips 145 thereon. From the ends of the needles the wires pass across the open inlet end of the baling box and through a series of notched guide lugs 158 (see Figs. 20 and 22) secured to the front edge of the upper plate 77 of the baling box between spaces formed in the angle bar 81$^a$. The free ends of the wires are gripped by the knotter mechanisms mounted upon the upper front portion of the baling box. As the straw, hay or like material is forced into the front end of the baling box, the wires are moved rearwardly therethrough and are thus passed around the upper, lower and rear sides of the bale. As this occurs, the wires are drawn out of the cans and through the needles. When sufficient material is forced into the end of the box to form a bale, the needles are shifted and the wires carried around the forward side of the bale.

Each of the three knotter mechanisms is carried by a cast metal bracket 159 which is hung at its upper rear end upon the shaft 141 and extends downwardly and forwardly therefrom. The lower forward ends of these brackets are secured to a transverse angle bar 160 which extends between the side bracket 142 in which the shaft 141 is journaled. The knotter mechanisms are operated by a series of combined cam and gear wheels 161 that are fixed to the shaft 141. This shaft is normally stationary, but is rotated through a single revolution at each operation of the machine to tie the wires about the bales.

Each of the knotter mechanisms is provided with a twister having two hook-like arms 162 and 163 mounted upon a common hub which is connected by a pin 164 to the lower end of a shaft 165 which is journaled in the bracket 159 and which is also longitudinally movable therethrough. The lower end of the shaft 165 is ball shaped and the opening through the hub of the twister is flared, as indicated in dotted lines in Fig. 22, so that the twister can rock to a slight extent upon the pin 164. A transverse plate 166 is secured to the lower end of the bracket 159 by bolts 167. This plate is arranged adjacent the twister and the shaft 165 extends therethrough. The plate is provided, as most clearly shown in Fig. 25, with a notch or guideway 168 for the tie wire. The shaft 165 is longitudinally movable to shift the twister to and from the plate 166. For this purpose, the inner end of the shaft is provided with a loose sleeve 169 held in place thereon by a collar 170 and the sleeve is provided with projecting pins 171 which engage notches in the sides of a yoke-lever 172. The inner end of the lever is provided with a roller 173 which engages an internal cam shoulder 174 on the wheel 161. The outer end of the yoke-lever engages a bolt 175 which extends through a lug 176 on the bracket 159 and a spring 177 on the bolt tends to hold the lever against the lug. By this arrangement, the shaft 165 is longitudinally shifted as the wheel 161 is rotated to yieldingly press the twister against the plate 166 and thereby clamp the wire between these parts, as hereinafter described.

The inner end of the shaft is also provided with a gear wheel 178 which is keyed to the shaft, but which is arranged to permit the longitudinal movement of the latter therethrough. The hub of this gear wheel is provided with a flange 179 which is flattened at diametrically opposite points. The flattened portions are arranged to engage segmental ribs 180 and 181 upon the face of the wheel 161 to thereby hold the gear and the knotting twister against revolution. Two segmental sets of gear teeth 182 and 183 are arranged between the ribs 180 and 181 and by engagement with the teeth of the gear 179 serve to rotate the shaft 165 and the knotting twister thereon. The teeth 182 are arranged to impart a half revolution to the twister and the teeth 183 of the twister are arranged to impart two and a half revolutions thereto.

A hook-shaped knife 185 is arranged against the inner face of the plate 166 and the hub 186 of this knife is keyed to a sleeve 187 which is arranged within the bore of the sleeve portion of the bracket 159 and about the shaft 165. A beveled gear-wheel 188 loosely mounted upon the shaft 165 is provided with a hub which is permanently clutched to the sleeve 187 to rotate the sleeve and knife 185 connected thereto. The beveled gear 188 is provided with a flange 189 having a flattened portion on one side thereof which is arranged to be engaged by a rib 190 on the face of the wheel 161 to hold the knife against movement. A segmental series of beveled gear-teeth 191 on the face of the wheel are adapted to engage the gear 188 and rotate the knife through a single revolution.

Mounted on the sleeve 187 against the inner face of the knife 185 is a spring-held clamp plate 192. One end of this plate is provided with an outturned portion 193 which engages the plate 166. The opposite end of the plate 192 is spaced apart from the plate 165 by a collar 194 mounted on a cylindrical lug 195 of the bracket 159. Springs 196 located within suitable sockets in the lower portion of the bracket 159 engage the plate 192 and press it toward the knife. The plate is provided with a notch or guideway 197 for the wire (see Fig. 26) and the spring 196 at this end of the clamp plate is preferably provided with means for adjusting its tension, such, for example, as an adjusting bolt 198 (see Fig. 22) which is arranged to engage the inner end of the spring.

When sufficient material is fed into the box to form a bale, a single revolution is imparted to the shaft 141 to thereby raise and lower the wire carrying needles 137 and operate the knotting twisters. When the knotter mechanism is idle, the free end of each wire $a$ extends over the arm 162 of the knotting twister, over the plate 166 and over the knife 185 and thence downwardly through a notch or slot 199 on the inner side of the knife. The free end of the wire is thus gripped between the inner side of the knife and the clamp plate 192 which is spring pressed against the knife. This position of the parts of the knotting mechanism is shown in Figs. 20, 22, 25 and 26. The gear segments 182, 183 and 191 on the wheel 161 are so arranged that as the latter is rotated the segment 182 will first act to impart a half revolution to the knotting twister and the gear segment 183 will thereafter impart two and a half revolutions to the twister to return it to normal position. The segment 191 is so arranged that it operates the knife after the twister has been given a half revolution by the segment 182, but, before the segment 183 acts on the twister, the segment 191 will advance the knife a half revolution and the remaining half revolution of the knife taking place together with the movement of the twister.

The first half revolution of the twister effected by the gear segment 182 brings the arm 163 thereon over the free end of the wire $a$ so that the free end is then gripped between the arm 163 and the end plate 166, as shown in Fig. 27. The segment 191 then moves the knife, the twister remaining stationary until the knife has completed a half revolution. By this time the needle has brought the other end of the wire upwardly and in front of the bale. This position of the parts is shown in Figs. 21 and 28. The knife and twister then move together so that the wire is cut off by the operation of the knife against the inner face of the plate 166, and the end of the tie wire about the bale is gripped by the arm 162 of the twister. After one revolution of the knife its movement is arrested and a new free end of the wire $a$ is gripped between it and the spring-held clamp plate 192, as shown in Fig. 29. The twister, however, is given two additional revolutions and the ends $a'$ of the tie about the bale are twisted together, as shown in Fig. 29. At the end of the twisting operation, the internal cam shoulder 174 permits the outward movement of the shaft 165 and of the knotting twister arms 162 and 163 to release the tie wires, and the needles are then returned to normal position and the wires are left in front of the end of the baling box. The parts are then in position for the succeeding operation.

The knotter operating shaft 141 has a gear 200 thereon driven from a gear 201 on the right-hand trunnion of the baling box through the medium of an intermediate train of gears 202, 203, and 204. The gear 204 is mounted upon a short shaft 205 on the upper face of the baling box and the gears 202 and 203 are connected together and mounted upon a short shaft 205ᵃ on the upper portion of the box. A sprocket wheel 206 fixed to the gear 201 is driven by a chain 207 that passes over a sprocket wheel 208 loosely mounted upon the stub shaft 62 (see Figs. 3 and 17). A brace bar 209 extends between the stub shaft 62 and the right-hand trunnion 85 of the baling box to relieve the parts of the strain incident to the tension on the chain 207. A chain tightening wheel 210 is adjustably mounted on the brace bar 209.

The hub of the sprocket 208 is provided with a flange 211 having a notch 212 therein which is arranged to be engaged by a clutch dog 213 which is eccentrically pivoted upon the gear 61. The gear 61 is also loosely mounted on the stub shaft 62 and is continuously driven during the operation of the machine by the pinion 60 on the main drive shaft. A spring 214 extends between studs 215 and 216 which are respectively pivoted to the tail of the clutch dog 213 and to the face of the gear 61. This spring is arranged to shift on opposite sides of a line extending between the pivots 217 and 218 of the dog and of the outer end of the spring to thereby hold the dog either in its normal disengaged, or in its operative engaged position, shown in Figs. 15 and 16. Normally, this spring 214 holds the dog in the position shown in Fig. 15 with a transverse pin 219 on the dog against a shoulder 220 formed on the face of the gear 61. The shift of the dog into and out of operative position is controlled by a trip arm 221 mounted upon a shaft 222 that is journaled in a suitable bracket on the adjacent side plate 15 and projects laterally therefrom. The end of the trip arm 221 is provided with an inwardly projecting segmental rib 223 which is arranged to coöperate with an outwardly projecting, triangular lug 224 on the clutch dog 213 to shift the clutch dog into and out of operative position. The shaft 222 is also provided with a trip arm 225 which is arranged to engage and release the clutch dog 65 and thereby throw the feed mechanism out of operation.

The trips 129, 221 and 225 for the clutches that control the knife, the tying mechanism and the feeding mechanism are all actuated by a common shifter which, in the form shown, comprises a four-armed member mounted upon a stub shaft 226 on the right-hand side plate 15 (see Figs. 3, 15 and 17). One arm 227 of the shifter is connected by a link 228 to an arm 229 on the shaft 222. A lug 230 is adjustably connected to the link 228 by bolts 231 extending through slots in the link. This lug is arranged to be engaged by a shifter actuating member which comprises a bar 232 slidably mounted in guideways formed in the bracket 83 on the right-hand side of the baling box. A compression spring 233 extends between the box and the rear end of the actuating bar 232 and holds the latter in normal position with a stud 234 thereon against a portion of the bracket. In this normal position of the parts, the forward end of the actuating bar 232 does not engage the lug 230 on the shifter as the baling box is oscillated, but the bar is moved to engage the lug when sufficient material has passed into the box to form a bale. This is effected by a toothed wheel 235 (see Figs. 3, 14 and 19) which is mounted upon a bracket 236 on the outer face of the side plate 82 of the baling box, the teeth of the wheel being arranged to extend through a slot 237 in the plate. The teeth of the wheel are thus engaged by the straw, hay or like material in the box, and the wheel is rotated by the movement of the material through the box. When sufficient material has passed into the box to form a bale, a lug 238 on the upper face of the wheel engages a shoulder 239 on the shifter actuating bar 232 and forces the latter forwardly against the tension of the spring 233, so that at the end of the next upward movement of the baling box the forward end of the bar will engage the lug 230 and operate the clutch shifter.

Another arm 240 on the clutch shifter pivotally engages a stud 241 at one end of a spring 242. The other end of the spring engages a stud 243 which is pivoted upon the bracket 51. This spring is arranged to shift on the opposite sides of a line between the shaft 226 and the pivot 244 of the stud 243 and thereby hold the four-armed shifter in either one of two positions, as shown in Figs. 15 and 16. The normal position of the shifter is shown in Fig. 15, but when the latter is moved by the actuator bar 232 on the baling box it occupies the position shown in Fig. 16. The shifter is restored to normal position by a dog 245 that is eccentrically pivoted on the gear 96 and which is arranged to engage a tappet 246 that is adjustably bolted to an arm 247 of the shifter. When sufficient material has passed into the box to form a bale, the shifter is moved, as described, as the box reaches the upper end of its movement. At this time the dog 245 has just passed the tappet 246, so that the shifter remains in the position shown in Fig. 16 for a full revolution of the shaft 93 and for a complete oscillation of the baling box. At the end of this one revolution of the shaft 93, the dog 245 engages the tappet 246 and moves the shifter back from the position shown in Fig. 16 to the normal position shown in Fig. 15. The fourth arm 248 of the shifter is provided with a tappet 249 adjustably connected thereto and which is arranged to engage a dog 250 pivotally mounted upon the heel end of the trip arm 129. A spring 251 normally presses the tail of the dog 250 against a stop lug 252 on the arm. A second spring 253 extends between the arm and the bracket 130 and holds the trip arm in normal position with a shoulder 129ª thereon engaging the periphery of the clutch disk 126. When the shifter is operated, the tappet 249 acts upon the dog 250 to lift the trip arm 129 out of engagement with the clutch dog 132. The shaft 114 is then rotated to operate the knife, as described. The tappet 249 moves past the dog 250, as shown in Fig. 16, so that the trip arm 129 is in position to disengage the clutch dog 127 after a single revolution of the knife operating shaft. On the restoring movement of the clutch shifter the tappet 249 moves idly past the dog 250.

The clutch dog 65 which controls the operation of the feed mechanism is normally in operative position, as shown in Fig. 15. When the shifter mechanism is moved by the actuator bar 232, the trip arm 225 is shifted to the position shown in Fig. 16, with a shoulder 225ª thereon against a flange 64ª on the gear 64 and the clutch dog 65 is disengaged to arrest the operation of the feed mechanism and hold it idle until the tying mechanism completes its movement. In its disengaged position, a pin 65ª on the dog engages the inner face of the flange 64ª. The clutch dog 220 which controls the operation of the wire tying mechanism is normally out of operation, but when the clutch shifter is moved, the trip arm 221 occupies the position shown in Fig. 16, so that the segmental flange 223 thereon engages the lug 224 on the dog and shifts it inwardly so that the dog engages the notch 212 in the hub of the sprocket 207 and the clutch thus remains in operation during one revolution of the shaft 93 or through two revolutions of the gear 61 and sprocket wheel 207. The gearing between the sprocket wheel and the operating shaft 141 of the tying mechanism is such that the latter shaft rotates through a single revolution at each operation. When the clutch shifter is restored to normal position, the trip arm 221 is moved into the position shown in Fig. 15, with the segmental flange 223 against the hub of the sprocket 207. It then engages the inner face of the triangular lug 224 and thus restores the clutch dog 213 to the normal position shown in Fig. 15.

By this arrangement, the feed mechanism, the knife mechanism and the tying mechanism are controlled by the movement of the material through the open ended baling box. The feed mechanism is normally in operation while the knife and the tying mechanisms are normally held out of operation. When sufficient material passes into the box to form a bale, the clutch shifter is operated to throw the feed mechanism out of operation and the knife and tying mechanisms into operation. A the end of the tying operation, this clutch is shifted to disengaged position and the clutch of the feeding mechanism is reëngaged to feed the material and form the next bale. Upon the upward movement of the wire carrying needles, a projecting arm 144ª on one of the connecting rods 144 (see Fig. 13) engages the end of the shifter actuating bar 232 and lifts it to disengage its shoulder 239 from the lug 238 on the controlling wheel 235. The bar can rock sufficiently in its guides to permit this movement. The spring 233 then returns the bar to its normal, inoperative position and the wheel 235 is then free to be rotated by the movement of the material through the baling box to again shift the bar when sufficient material is compressed into the box to form another bale.

In transporting the machine, the baling box is held elevated to hold the wire carrying needles well above the ground by a U-catch 255 (see Fig. 2) which is pivotally mounted upon the end of a bar 256 projecting from the adjacent side plate 15 and which catch is arranged to engage one of the spokes of the pulley 59. A brace bar 257 extends between the plate 15 and the bar 256. When the machine is in operation, the catch is turned back into the position shown in dotted lines in Fig. 2. The front part of the machine frame is elevated above the front axle and is so connected thereto that the front wheels can be swung beneath the frame for convenience in turning and also for moving the tongue of the front axle out of the way in operating the machine and in operating the machine the tongue will not interfere with free access to the front end of the conveyer. The size of the bales can be regulated by substituting a larger or a smaller wheel for the wheel 235.

If it is desired to highly compress the hay or straw, additional means are provided for resisting the movement of the bales through the open-ended box. This additional means comprises two series of spur toothed wheels 258 which are mounted above and below the discharge end of the box upon shafts 259. These shafts are journaled in bearings, each of which comprises upper and lower wooden blocks 260 secured upon the outer faces of the upper and lower plates 77 and 78 of the baling box by bolts 261, the parts being so arranged that the toothed wheels project through slots in these plates, so as to engage the formed bales at the discharge end of the baling box. The blocks 260 of each bearing are spaced somewhat apart and one of the bolts 261 is provided with an adjusting hand nut 262 so that the blocks may be forced together to act as brakes to resist the rotation of the shafts 259 and of the wheels carried thereby. The wheels thus resist the movement of the bales through the box and increase the pressure necessary to move them through the box. In consequence, the pressure exerted in compressing the material into a bale is increased and the material is thereby more effectually compacted into the bales.

It is obvious that numerous changes may be made in the details set forth without departure from the essentials of the invention as set forth in the claims.

I claim as my invention:—

1. In a baling machine, the combination of an open ended baling box adapted to hold two or more bales, a feed roller mechanism acting when in operation to continuously feed and compress material into one end of said box against the previously formed bale and thereby force the completed bales from the opposite discharge end of said box, said box being formed of upper and lower sections pivotally connected one to the other at the inlet end thereof, tie rods and springs connecting and compressing said box sections together at the discharge end, mechanism for tying wire about the bales, and clutch mechanism controlled by the movement of the material through said open ended box for alternately throwing said feed roller mechanism and said tying mechanism into and out of operation.

2. In a baling machine, the combination with a frame, of an oscillating baling-box open at its opposite ends on said frame adapted to hold two or more bales, feeding and pressing rollers for forcing the material into one end of said box and for forcing the complete bales from its opposite discharge end, mechanism for tying wire about the bales and means for throwing said feeding and tying mechanisms alternately into and out of operation.

3. In a baling machine, the combination with a frame, of an oscillating baling-box open at its opposite ends on said frame adapted to hold two or more bales, feeding and pressing rollers for forcing the material into one end of said box and for forcing the complete bales from its opposite discharge end, means for exerting pressure upon the sides of the bales at the discharge end of said box, and means controlled by the movement of material through said open-ended box for tying wire about the bales and for throwing said feeding mechanism out of operation.

4. In a baling machine, the combination with a frame, of an oscillating baling-box open at its opposite ends on said frame adapted to hold two or more bales, feeding and pressing rollers for forcing the material into one end of said box and for forcing the complete bales from its opposite discharge end, said box being formed of separate, longitudinally extending sections, adjustable spring means for pressing the sections of said box together at the discharge end thereof, mechanism for tying wire about the bales, and means controlled by the movement of the material through said open-ended box for alternately throwing said feed rollers and said tying mechanism into and out of operation.

5. In a baling machine, the combination with a frame, of a baling-box comprising upper and lower sections, said upper section being pivotally mounted at its rear end on said frame and said lower section being pivotally connected at its forward end to said upper section, means for connecting and pressing the rear ends of said sections together, means for oscillating said baling box, mechanism for feeding and compressing the material into the forward end of said box and for folding the same back and forth therein, and mechanism for tying wire about the bales.

6. In a baling machine, the combination with a frame, of a baling-box mounted on said frame, means for moving said box back and forth, fixed transverse plates extending across and adjacent the path of movement of the forward end of the box and against which the material in the box abuts, rollers for feeding the material in a web between said plates into the end of said box and for folding the same back and forth therein, and means for tying wires about the bales.

7. In a baling machine, the combination with a frame, of an open-ended baling box pivotally mounted at its rear end on said frame, transverse segmental plates extending across the path of movement of the forward end of said box, means for oscillating said box, a pair of upper and lower rollers arranged between said plates for guiding and compressing the material into the box and for folding the same back and forth therein, means on the box for rotating said guiding and compresing rollers in opposite directions, a pair of rollers for feeding the material in a web between said guiding and compressing rollers, and means controlled by the movement of the material through said open-ended box for tying wires about the bales.

8. In a baling machine, the combination with a frame, of an open-ended baling box pivotally mounted at its rear end on said frame, transverse segmental plates extending across the path of movement of the forward end of said box, means for oscillating said box, a pair of upper and lower rollers arranged between said plates for guiding and compressing the material into the box and for folding the same back and forth therein, means on the box for rotating said guiding and compressing rollers in opposite directions, said rollers having oppositely facing beveled teeth for engaging the material and forcing it toward the upper and lower portions of the box, a pair of upper and lower rollers for feeding the material in a web between said guiding and compressing rollers and mechanism for tying wires about the bales.

9. In a baling machine, the combination with a frame, of an open-ended baling box pivotally mounted at its rear end on said frame, transverse segmental plates extending across the path of movement of the forward end of said box, means for oscillating said box, a pair of upper and lower rollers arranged between said plates for guiding and compressing the material into the box and for folding the same back and forth therein, means on the box for rotating said guiding and compressing rollers in opposite directions, a set of segmental wire carrying needles, means for shifting said needles in front of said box, said segmental plates having guide-ways for said needles and said guiding rollers being sectional to permit the passage of said needles, a pair of rollers for delivering the web to said guiding and compressing rollers, and knotting twisters for tying the wires.

10. In a baling machine, the combination with a frame, of an open-ended baling box pivotally mounted at its rear end on said frame, means for oscillating said box, a pair of rollers having oppositely facing teeth for guiding and compressing the material into the forward end of the box and for folding the same back and forth therein, a segment rack on the box for rotating said rollers in opposite directions, a pair of feed rollers for delivering the material in a web between said guiding and compressing rollers, mechanism for tying wires about the bales, and means controlled by the movement of the material through said open-ended box for alternately throwing said feed rollers and said tying mechanism into and out of operation.

11. In a baling machine, the combination with a frame, of an open-ended baling box, upper and lower guiding and compressing rollers at the inlet end of said box, upper and lower feed rollers for delivering material in a web to said guide rollers, an upwardly and rearwardly inclined, endless conveyer terminating at its rear end above said feed rollers, an inclined guide plate extending downwardly from the rear end of said conveyer to said feed rollers, a supplemental, endless conveyer inclined downwardly and rearwardly above the rear end of said main conveyer, gearing for operating said conveyers and said feed rolls, and means controlled by the movement of material through said open-ended box for throwing said gearing into and out of operation.

12. In a baling machine, the combination with a frame, of an open-ended baling box, upper and lower guiding and compressing rollers at the inlet end of said box, upper and lower feed rollers for delivering material in a web to said guide rollers, an upwardly and rearwardly inclined, endless conveyer terminating at its rear end above said feed rollers, an inclined guide plate extending between the rear end of said conveyer and said feed rollers, a supplemental, endless conveyer inclined downwardly and rearwardly above the rear end of said main conveyer, swinging, spring-pressed arms hung on the drive shaft of said main conveyer wherein said upper feed roller is journaled, a main drive shaft, intermeshing gears connecting said shaft to said lower feed roller and to the drive shafts of said main and supplemental conveyers, intermeshing gears on the main conveyer drive shaft and said upper feed roll, and means controlled by the passage of material through said open-ended box for connecting and disconnecting said main drive shaft and said gears.

13. In a baling machine, the combination with the front and rear axles, of a frame mounted on said axles and elevated above said front axle to permit the turning of the front wheels thereunder, an oscillating baling box at the rear portion of said frame, guiding and feeding rollers mounted at the upper, central portion of said frame for delivering the material into the forward end of said box, and an upwardly and rearwardly inclined conveyer extending over the forward portion of the machine for delivering the material to said feed rollers.

14. In a baling machine, the combination with a frame, a baling box thereon, and feeding rollers for delivering the material in a web to said box, of a knife for severing the web between said rollers and said box, a crank shaft for lowering and raising said knife, and means for shifting said knife longitudinally as it is moved in vertical direction.

15. In a baling machine, the combination with a frame, a baling box thereon, and feeding rollers for delivering the material in a web to said box, of a knife for severing the web between said rollers and said box, a crank shaft for lowering and raising said knife, a wooden strip in rear of said feed rollers against which said knife operates, and a link pivoted to said knife and to a portion of said frame for shifting the same longitudinally as the knife is moved vertically.

16. In a baling machine, the combination with a frame, a baling box thereon, and feeding rollers for delivering the material in a web to said box, of a knife for severing the web between said rollers and said box, a crank shaft for lowering and raising said knife, depending links pivoted to said crank shaft and to said knife, fixed guides engaging the ends of said knife, and a link pivoted to one end of said knife and to the side of said frame.

17. In a baling machine, the combination of an open ended baling box, mechanism for feeding and compressing the material into one end of said box against the previously formed bale and for forcing the completed bales from the opposite discharge end of said box, wire carrying mechanism and coöperating wire knotting mechanism for tying wire about said bales, a common, intermittently operating shaft for actuating said wire carrying mechanism and said wire knotting mechanism, said shaft being arranged to rotate in one direction only, a clutch having a pre-determined movement for effecting the operation of said actuating shaft, and means controlled by the movement of material through said open ended box for throwing said clutch into operation.

18. In a baling machine, the combination with a frame, a baling box pivotally mounted thereon, means for oscillating said box and means for feeding the material thereto, of wire carrying and knotting mechanisms for tying wire about the bales, a common drive shaft for said mechanisms mounted upon said oscillating box and arranged to rotate in one direction only, a chain of gearing for rotating said shaft in one direction, one of the members of said gearing being concentric with the pivotal axis of said box, a clutch for throwing said gearing into and out of operation and means controlled by the movement of material through said box for throwing said clutch into operation.

19. In a baling machine, the combination with a baling box, and means for feeding material thereto, of wire carrying needles and coöperating wire knotting devices for tying wire about the bales, a common, intermittently operating shaft for actuating said wire carrying needles and said knotting devices, said shaft being arranged to rotate in one direction only, a clutch having a pre-determined movement for effecting the operation of said actuating shaft, a shifter for said clutch, a toothed wheel mounted on said baling box and arranged to be engaged and rotated by the movement of the material therethrough, means controlled by said wheel for actuating said shifter and thereby throw said clutch into operation.

20. In a baling machine, the combination with a frame, an open-ended baling box pivotally mounted thereon, means for oscillating said box and means for feeding the material thereto, of knotters mounted on said box, needles for carrying the wire to said knotters, a drive shaft on said oscillating box for operating said knotters, cranks on said shaft connected to said needles, gearing for rotating said shaft in one direction, a clutch controlling the operation of said shaft, a toothed wheel mounted on the side of said oscillating box arranged to be engaged and rotated by the material therein, means controlled by said wheel for throwing said clutch into operation and means for throwing said clutch out of operation after a pre-determined movement thereof.

21. In a baling machine, the combination with a frame, and a baling box thereon, of a feeding conveyer and rollers for delivering the material to said box, a main drive shaft, gearing connecting said shaft and said feeding conveyer and rollers, normally engaged clutch members interposed in said gearing, a trip for disengaging said clutch members, means controlled by the movement of material through said box for shifting said trip and disengaging said clutch and independent means for restoring said trip to permit the reëngagement of said clutch members.

22. In a baling machine, the combination with a frame, an open-ended baling box pivotally mounted thereon and means for oscillating said box, of a feeding conveyer and feeding rolls for delivering the material to said box, a drive shaft, gears connecting said drive shaft and said conveyer and feed rollers, normally engaged clutch members interposed in said gearing, a trip for disengaging said clutch members, a shifter for said trip, an actuating bar for said shifter mounted on said box and a toothed wheel mounted on said box and arranged to be engaged and shifted by the material therein for moving said bar to operative position.

23. In a baling machine, the combination with a frame and baling box thereon open at its opposite ends, of mechanism for feeding and compressing the material within one end of said box and for forcing the completed bale from its opposite discharge end, mechanism for tying wire about the bales, a main drive shaft, separate clutches controlling the connection of said main drive shaft and said feeding and tying mechanisms and means controlled by the movement of the material through said open-ended box for alternately throwing said clutches into and out of operation.

24. In a baling machine, the combination with a frame, a baling box pivotally mounted on said frame and means for oscillating said box, of feed rollers for delivering the material to said box, needle carrying and knotter mechanism for tying wires about the bales in said oscillating box, a drive shaft for said mechanism, a main drive shaft for the machine, gears connecting said main drive shaft to said feed rolls and to the drive shaft for said tying mechanism, a normally engaged clutch interposed in the gearing between said shaft and said feed rolls, a normally disengaged clutch interposed between said main drive shaft and said shaft for the tying mechanism, a shifter for throwing said clutches alternately into and out of operation, an actuator bar for said shifter mounted on said oscillating box and means operated by the passage of material through said open-ended box for moving said actuator bar to operative position.

25. In a baling machine, the combination with a frame, a baling box thereon and means for feeding material in the web to said box, of a knife for severing the web between said feeding mechanism and said box, an operating shaft for said knife, a clutch controlling the operation of said shaft, a trip normally holding said clutch out of operation and arranged to automatically disengage the same after a single revolution of said shaft, a shifter for operating said trip and means controlled by the movement of material through the box for actuating said shifter.

26. In a baling machine, the combination with a frame, an open-ended box pivotally mounted on said frame and means for oscillating said box, of mechanism for feeding material in the web to said box and a knife for severing the web between said feeding means and said box, an operating crank shaft for said knife normally holding the same in raised position, a clutch controlling the operation of said shaft, a trip for normally holding said clutch in disengaged position and arranged to automatically release the same after a single revolution of said shaft, a shifter for moving said trip, an actuator bar for said shifter mounted on said box and a toothed wheel engaged and rotated by the material in said box for shifting said bar to operative position.

27. In a baling machine, the combination with a frame and a baling box mounted thereon, of feed rolls for delivering the material in the web to said box, a knife for severing the web between said feed rolls and said box, wire carrying needles and knotters for tying wires about the bales, operating shafts for said feed rolls, said knife and said tying mechanism, a main drive shaft, separate clutches controlling the connection between said main drive shaft and said operating shafts, a shifter for alternately throwing said clutches into and out of operation, means controlled by the movement of material through the box for the movement of said shifter in one direction and means controlled by the movement of said main drive shaft for restoring said shifter.

28. In a baling machine, the combination with a frame, a baling box pivotally mounted thereon and means for oscillating said box, of feed rolls for delivering the material to the said box, needle and knotting mechanism for tying wires about the bales, a knife for severing the web of material between said rolls and said box, a main drive shaft, operating shafts for said feed rolls, said knife and said tying mechanism, gears and separate clutches interposed between said main drive shaft and said operating shafts, a shifter for throwing said clutches into and out of operation, an actuator bar for said shifter mounted on said box and a toothed wheel arranged to be engaged and rotated by the material in said box for moving said actuator bar to operative position.

29. In a baling machine, the combination with a frame, of a baling box pivotally mounted on said frame, means for oscillating said box and means for feeding the material thereto, a series of knotters mounted upon the upper forward end of said box, a series of segmental needles hung upon the pivotal axis of said box, said needles being arranged to carry the wire in front of the inlet end of said box to said knotters, said needles comprising flat bars having guide flanges at their outer edges and guide rollers secured to the side faces thereof, an operating shaft for said knotters and said needles mounted on said box and drive gearing for said operating shaft, one of the members of said gearing being mounted upon one of the trunnions of said box.

30. In a baling machine, the combination with a frame, of a baling box pivotally mounted on said frame, means for oscillating said baling box, means for feeding material thereto, wire carrying and knotting mechanism mounted on said box for tying wire about the bales, a clutch for throwing said wire carrying and knotting mechanism into and out of operation, a shifter for said clutch, said clutch and said clutch shifter being mounted on said frame, an arm mounted on said oscillating baling box and arranged to engage and operate said clutch shifter, and means controlled by the passage of material through said box for throwing said arm into position to engage said clutch shifter as said baling box is oscillated.

31. In a baling machine, the combination with the frame, of an oscillating open-ended baling box thereon, mechanism for feeding and compressing material into one end of the box against the previously formed bale and for forcing the completed bales from the discharge end of said box, mechanism for tying wire about the bales, clutch mechanism for alternately throwing said baling and said tying mechanisms alternately into and out of operation, a shifter for said clutch mechanism, an arm on said oscillating box for operating said shifter and means arranged to be engaged and operated by the material passing through the box for moving said arm into position to engage said shifter, substantially as described.

WILLIAM ZACHOW.

Witnesses:
ELEANOR HAGENOW,
KATHARINE GERLACH.